United States Patent
Lee et al.

(10) Patent No.: US 10,846,191 B2
(45) Date of Patent: Nov. 24, 2020

(54) SYSTEM AND METHOD FOR ANALYSING CAUSE RELATED TO EXCESSIVE POWER CONSUMPTION OF APPLICATION

(71) Applicant: AJOU UNIVERSITY INDUSTRY-ACADEMIC COOPERATION FOUNDATION, Suwon-si (KR)

(72) Inventors: Jung Won Lee, Seoul (KR); Du San Baek, Incheon (KR); Yoo Rim Choi, Yeoju-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 347 days.

(21) Appl. No.: 15/890,839

(22) Filed: Feb. 7, 2018

(65) Prior Publication Data
US 2018/0314614 A1 Nov. 1, 2018

(30) Foreign Application Priority Data
Apr. 26, 2017 (KR) .................. 10-2017-0053398

(51) Int. Cl.
*G06F 1/00* (2006.01)
*G06F 11/30* (2006.01)
*G06F 1/3206* (2019.01)
*G06F 11/34* (2006.01)

(52) U.S. Cl.
CPC ........ *G06F 11/3062* (2013.01); *G06F 1/3206* (2013.01); *G06F 11/302* (2013.01); *G06F 11/3428* (2013.01)

(58) Field of Classification Search
CPC .. G06F 11/3062; G06F 1/3206; G06F 11/302; G06F 11/3428; G06F 11/324; G06F 11/3447; G06F 11/3089; G06F 2201/81
See application file for complete search history.

(56) References Cited

U.S. PATENT DOCUMENTS

2009/0231152 A1* 9/2009 Tung ................... G06F 1/206
340/660

FOREIGN PATENT DOCUMENTS

| KR | 10-2013-0121230 A | 11/2013 |
|----|-------------------|---------|
| KR | 10-2016-0130271 A | 11/2016 |

* cited by examiner

*Primary Examiner* — Xuxing Chen
(74) *Attorney, Agent, or Firm* — Sughrue Mion, PLLC

(57) ABSTRACT

An apparatus for analyzing a cause of excessive power consumption of an application according to an exemplary embodiment of the present disclosure includes: an estimating unit which estimates a context which is a specific situation defined in accordance with an environment in which the application is executed, based on operation information on an operation of corresponding modules which correspond to an application which is being currently executed and coding information of the application; a calculating unit which calculates a power consumption against power limit regarding whether the real-time power consumption exceeds a threshold value, based on real-time power consumption for every corresponding module and the threshold value for the power consumption requirement for every corresponding module; and a storing unit which matches and stores the calculated power consumption against power limit and the estimated context.

16 Claims, 9 Drawing Sheets

[FIG. 1]
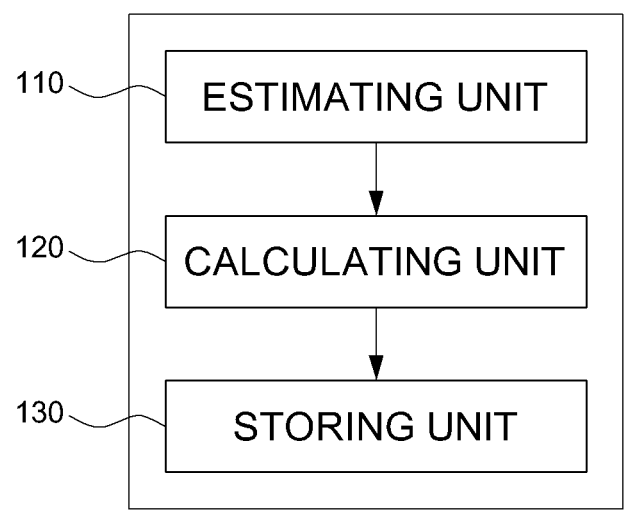

[FIG. 2A]

```
@ Contexts_Start
Context Processing Function(SensorData a, SensorData b) {
    if (a != value1) {
    @ Context_A_Start
            User Code
    @ Context_A_End
    }
    Else {
            User Code
}}
@ Contexts_End
```

[FIG. 2B]

```
@ Contexts_Start
Context Processing Function(SensorData a, SensorData b) {
    if (a == Undefind || b == Undefind) {
            User Code
    }
    else if (a != value1) {
    @ Context_B_Start
            User Code
    @ Context_B_End
    }
    else if (a == value1, b > value2) {
    @ Context_C_Start
            User Code
    @ Context_C_End
    }
    Else {
            User Code
}}
@ Contexts_End
```

[FIG. 3]
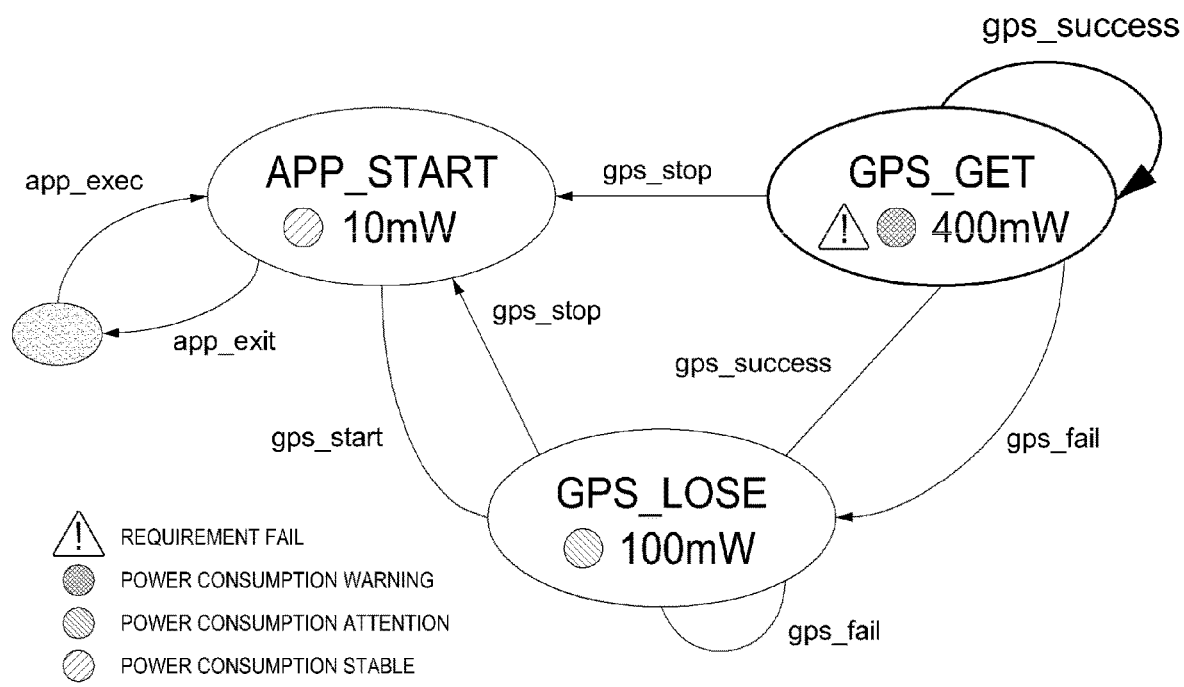

[FIG. 4]
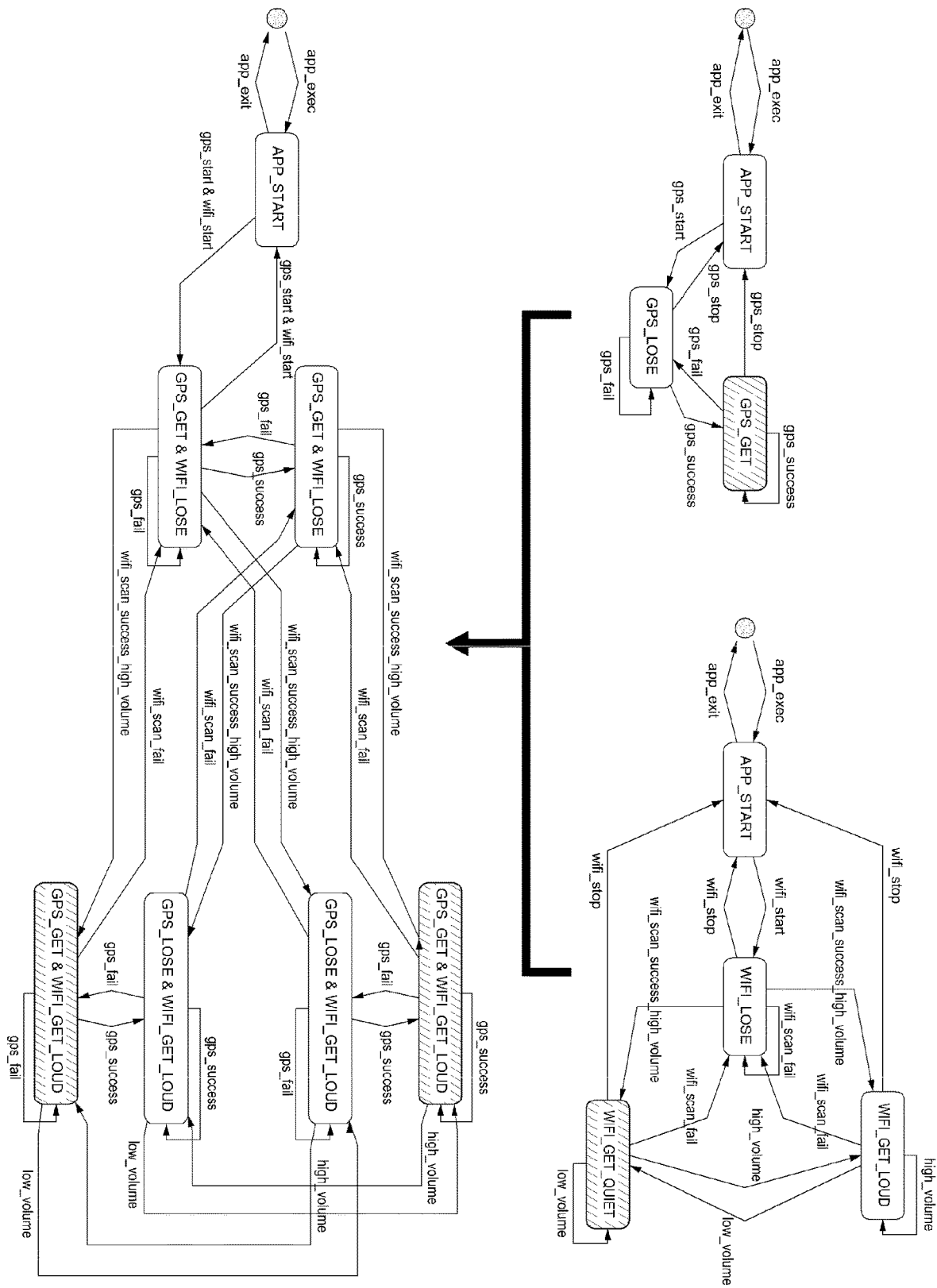

[FIG. 5]
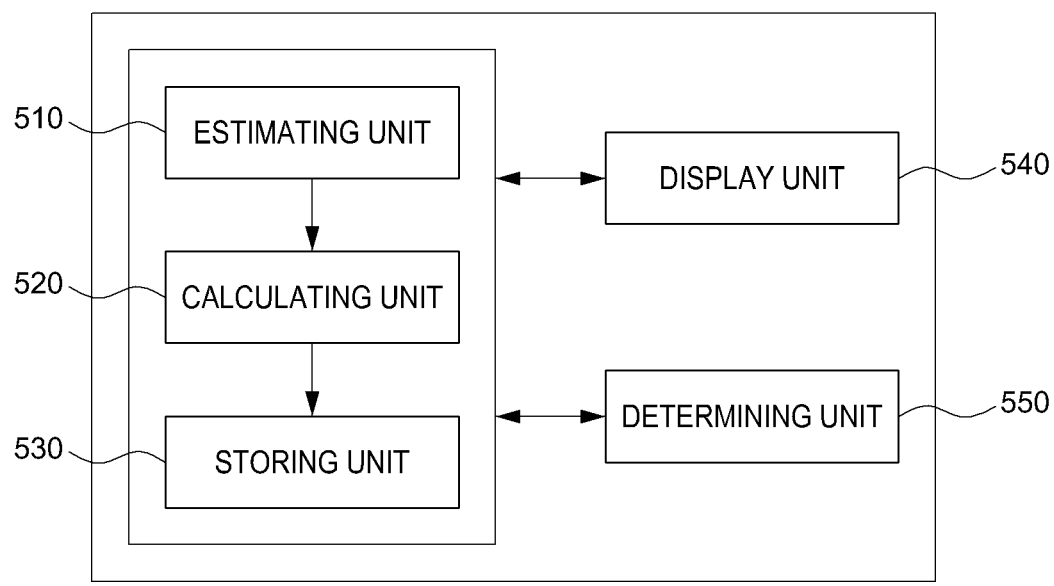

[FIG. 6]
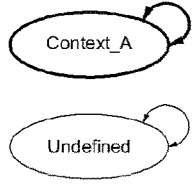

[FIG. 7]
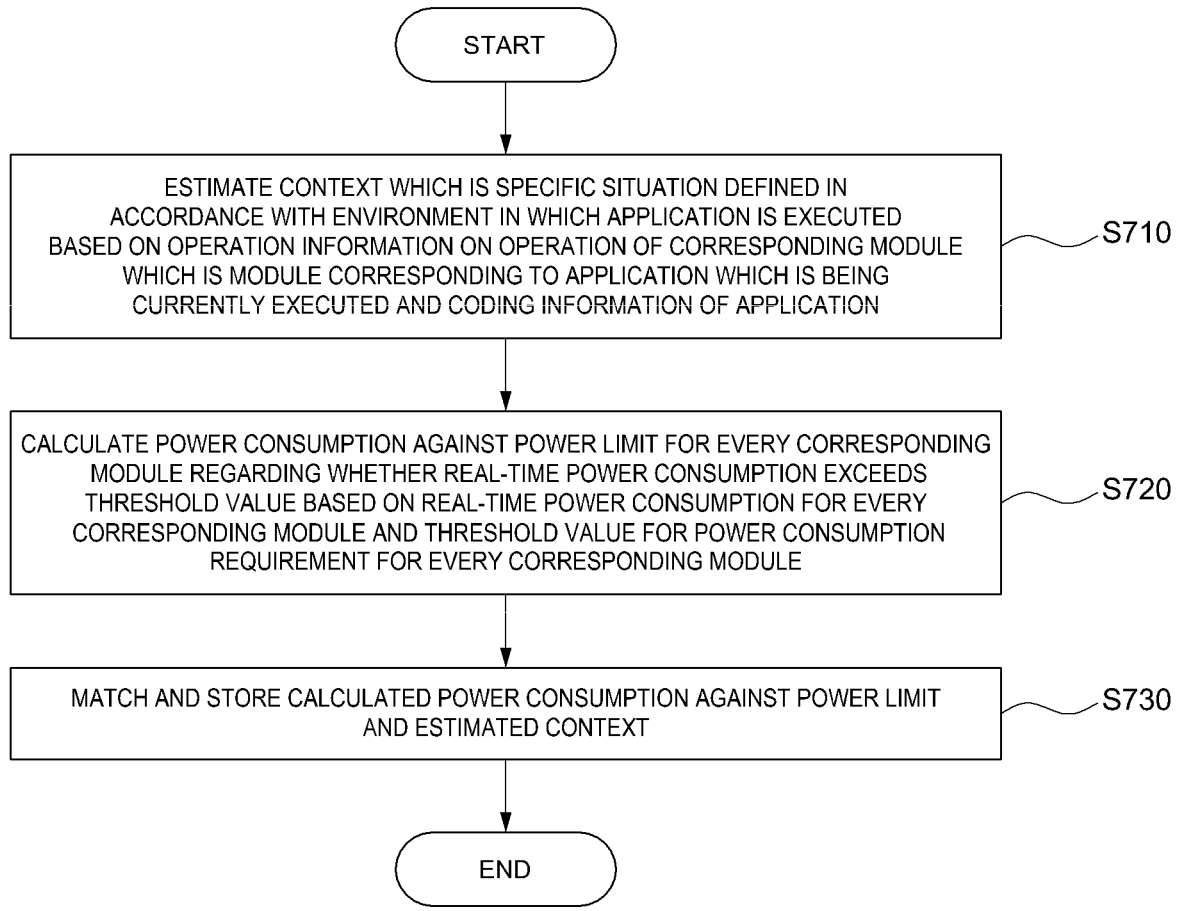

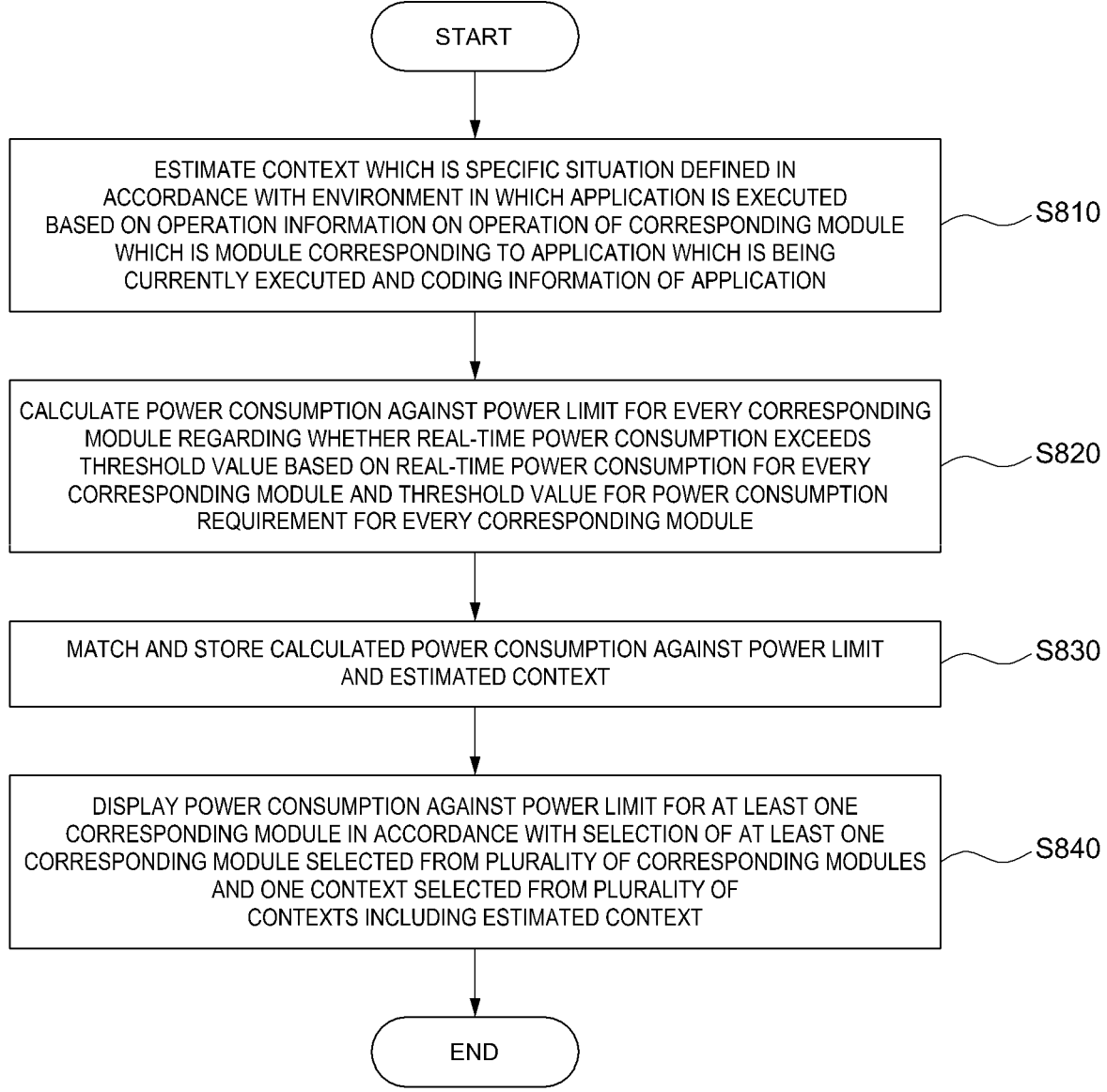
[FIG. 8]

[FIG. 9]
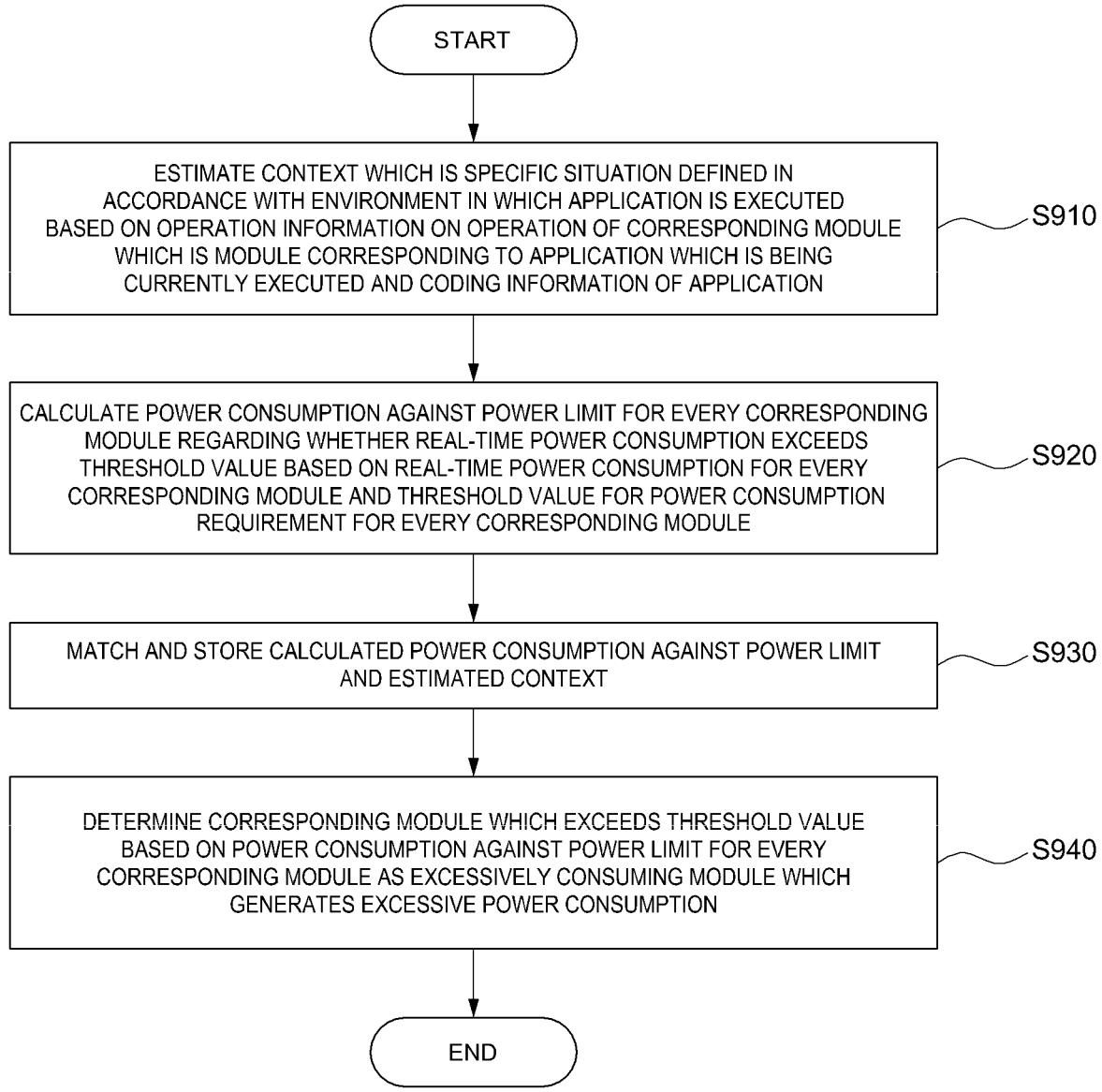

SYSTEM AND METHOD FOR ANALYSING CAUSE RELATED TO EXCESSIVE POWER CONSUMPTION OF APPLICATION

CROSS-REFERENCE TO RELATED APPLICATIONS

This application claims the priority of Korean Patent Application No. 10-2017-0053398 filed on Apr. 26, 2017 in the Korean Intellectual Property Office, the disclosure of which is incorporated herein by reference.

BACKGROUND

Field

Exemplary embodiments of the present disclosure related to power analysis of an application, and more particularly, to an apparatus and a method for analyzing a cause of excessive power consumption of an application which is being executed.

Description of the Related Art

Mobile devices have limited power such as a battery. The limited power is an important element which is directly related to the usage time of the mobile devices so that it should be considered in relation to the mobile devices and applications. Importance of the power is emerged more in a context awareness application having a function of recognizing an executing situation. This is because the context awareness application consistently uses a sensor to collect and analyze information on a user and deduct a situation to provide an appropriate service therefor. Accordingly, sustainable context awareness needs to be accompanied by optimization of power which is consumed by the application.

Therefore, in order to optimize the power of the context awareness application, it is required to develop a technique which provides information on a hardware module and a sensor of a mobile device in accordance with an operation of an application and supports mobility for analysis of various environments according to positions and surrounding environments and real time analysis to not only simply compare power consumption, but also find a cause which degrades power efficiency.

The related art is disclosed in Korean Registered Patent Publication No. 10-0994848 (entitled Power saving system, published on Nov. 17, 2011).

SUMMARY

Exemplary embodiments of the present disclosure provide an apparatus and a method for analyzing a cause of excessive power consumption of an application which analyzes a module which generates excessive power consumption in consideration of an operating status of each module corresponding to an application which is being executed and changes in an operating status.

Technical problems of the present disclosure are not limited to the above-mentioned technical problems, and other technical problems, which are not mentioned above, can be clearly understood by those skilled in the art from the following descriptions.

According to an exemplary embodiment of the present disclosure, an apparatus for analyzing a cause of excessive power consumption of an application includes: an estimating unit which estimates a context which is a specific situation defined in accordance with an environment in which the application is executed, based on operation information on an operation of corresponding modules which correspond to an application which is being currently executed and coding information of the application; a calculating unit which calculates a power consumption against power limit for every corresponding module regarding whether the real-time power consumption exceeds a threshold value, based on the real-time power consumption for every corresponding module and the threshold value for the power consumption requirement for every corresponding module; and a storing unit which matches and stores the calculated power consumption against power limit and the estimated context.

The coding information may include a source code and an annotation code indicating explanation on the source code and the estimating unit may estimate the context by comparing the source code and the annotation code with the operation information.

The context may be selected from a plurality of contexts defined in accordance with an environment in which the application is executed.

The calculating unit may calculate the real-time power consumption based on a power model representing a power consumption for every corresponding module in accordance with execution of the application and state information representing at least one operation for every corresponding module.

The calculating unit may calculate the real-time power consumption further based on state transition information representing changes from an initial state for every corresponding module to a current state which selectively passes through at least one intermediate state.

The calculating unit may calculate a real-time power consumption for every corresponding module based on a state diagram including a changing sequence between the initial state, the intermediate state, and the current state for every corresponding module which is generated using the state information and the state transition information.

The state diagram may further include a power level corresponding to at least one operation state among a plurality of power levels set based on the power consumption against power limit.

When a plurality of corresponding modules operates in accordance with execution of the application, the calculating unit may calculate the real-time power consumption for each of the plurality of corresponding modules based on a combined state diagram generated by combining state diagrams corresponding to the plurality of corresponding modules.

The power consumption against power limit may be displayed by at least one of a ratio of a power consumption against power limit representing a ratio of the real-time power consumption with respect to the threshold value and a graph regarding the ratio of the power consumption against power limit.

The apparatus may further include a display unit which displays a power consumption against power limit for at least one corresponding module in accordance with a combination of at least one corresponding module selected from the plurality of corresponding modules and one context selected from a plurality of contexts including the estimated context.

The apparatus may further include a determining unit which determines a corresponding module which exceeds the threshold value as an excessively consuming corresponding module which generates excessive power consumption, based on a power consumption against power limit for every corresponding module.

When at least one corresponding module is determined as the excessively consuming corresponding module, the display unit may further display coding identification information for identifying the coding information corresponding to the estimated context.

According to another exemplary embodiment of the present disclosure, a method for analyzing a cause of excessive power consumption of an application by an apparatus for analyzing a cause of excessive power consumption of the application includes: estimating a context which is a specific situation defined in accordance with an environment in which the application is executed, based on operation information on an operation of corresponding modules which correspond to an application which is being currently executed and coding information of the application, by an estimating unit; calculating a power consumption against power limit regarding whether the real-time power consumption exceeds a threshold value, based on the real-time power consumption for every corresponding module and the threshold value regarding the power consumption requirement for every corresponding module, by a calculating unit; and matching and storing the calculated power consumption against power limit and the estimated context, by a storing unit.

The coding information may include a source code and an annotation code indicating explanation on the source code and the estimating may include estimating the context by comparing the source code and the annotation code with the operation information.

The calculating may include calculating the real-time power consumption based on a power model representing a power consumption for every corresponding module in accordance with execution of the application and state information representing at least one operation for every corresponding module.

The calculating may include calculating the real-time power consumption further based on state transition information representing changes from an initial state for every corresponding module to a current state which selectively passes through at least one intermediate state.

The calculating may include calculating a real-time power consumption for every corresponding module based on a state diagram including a changing sequence between the initial state, the intermediate state, and the current state for every corresponding module which is generated using the state information and the state transition information.

The calculating may further include calculating a real-time power consumption for each of the plurality of corresponding modules based on the combined state diagram which is generated by combining state diagrams corresponding to a plurality of corresponding modules when the plurality of corresponding modules is operated in accordance with the execution of the application.

The method may further include displaying a power consumption against power limit for at least one corresponding module in accordance with a combination of at least one corresponding module selected from the plurality of corresponding modules and one context selected from a plurality of contexts including the estimated context.

The method may further include determining a corresponding module which exceeds the threshold value as an excessively consuming corresponding module which generates excessive power consumption, based on a power consumption against power limit for every corresponding module.

Specific items of other embodiments are included in the detailed description and the accompanying drawings.

According to an exemplary embodiment of the present disclosure, a module which generates excessive power consumption is analyzed in consideration of an operating status for each of modules corresponding to an application which is being executed and changes in the operating status, thereby providing a development environment for optimizing the power consumption of the module.

According to an exemplary embodiment of the present disclosure, even when a plurality of modules operates in accordance with an executing environment of the application which is being executed, a status of each of the plurality of modules is collectively considered, so that power which is consumed by the plurality of modules may be accurately analyzed in real time.

According to another exemplary embodiment of the present disclosure, a power status of the corresponding module and related detailed information are visually displayed based on analysis of the module which causes excessive power consumption, thereby recognizing information on a module which excessively consumes power in real time.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 is a block diagram illustrated for explaining an apparatus for analyzing a cause of excessive power consumption of an application according to an exemplary embodiment of the present disclosure;

FIGS. 2A and 2B are views illustrated for explaining a method for estimating a context according to an environment in which an application is executed, according to an exemplary embodiment of the present disclosure;

FIG. 3 is a conceptual diagram illustrated for explaining a status diagram for every corresponding module, according to an exemplary embodiment of the present disclosure;

FIG. 4 is a conceptual diagram illustrated for explaining a combined status diagram according to a combination for each of a plurality of corresponding modules, according to an exemplary embodiment of the present disclosure;

FIG. 5 is a block diagram illustrated for explaining an apparatus for analyzing a cause of excessive power consumption of an application according to another exemplary embodiment of the present disclosure;

FIG. 6 is a view illustrated for explaining a state in which in accordance with selection of a contest and a corresponding module, power consumption against power limit for the selected corresponding module and associated details are displayed, according to an exemplary embodiment of the present disclosure;

FIG. 7 is a flowchart illustrated for explaining a method for analyzing a cause of excessive power consumption of an application according to an exemplary embodiment of the present disclosure;

FIG. 8 is a flowchart illustrated for explaining a method for analyzing a cause of excessive power consumption of an application according to another exemplary embodiment of the present disclosure; and FIG. 9 is a flowchart illustrated for explaining a method for analyzing a cause of excessive power consumption of an application according to still another exemplary embodiment of the present disclosure.

DETAILED DESCRIPTION OF THE PREFERRED EMBODIMENT

Advantages and/or characteristics of the present disclosure and a method of achieving the advantages and/or characteristics will be clear by referring to exemplary embodiments described below in detail together with the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the disclosure, and the present disclosure will be defined by the appended claims. Like reference numerals indicate like elements throughout the specification.

Hereinafter, exemplary embodiments of the present disclosure will be described in detail with reference to accompanying drawings.

FIG. 1 is a block diagram illustrated for explaining an apparatus for analyzing a cause of excessive power consumption of an application according to an exemplary embodiment of the present disclosure.

Referring to FIG. 1, an apparatus for analyzing a cause of excessive power consumption of an application according to an exemplary embodiment of the present disclosure includes an estimating unit 110, a calculating unit 120, and a storing unit 130.

The estimating unit 110 may estimate a context which is a specific situation defined according to an environment in which an application is executed.

The context is various situation information on a surrounding environment occurring in the real space when an application is used and may be arbitrarily set by a developer. For example, the context may include various situations which may be experienced in everyday life such as certain indoor or outdoor situations, walking or running situations, driving situations, or sleeping or awaking situations. For reference, the context may be estimated from a plurality of contexts which is defined in advance in accordance with an environment in which an application is executed. That is, one context may be selected from a plurality of contexts in which various situations generated in a real space are defined.

The estimating unit 110 estimates a context based on operation information on an operation of corresponding modules which correspond to an application which is being currently executed and coding information of the application. In other words, the estimating unit 110 may estimate a context through operation information indicating how a driving module operates in accordance with execution of an application to be analyzed and a state of the driving module and coding information on a code which is implemented in advance by a developer for the executed application.

Here, the operation information is information on the corresponding module which operates in a mobile device in accordance with execution of the application and may include a model name of the module, an executing time, a CPU usage rate, and a communication related state. For reference, the corresponding module is a module which is designed to be independently installed, substituted, and used to provide a basic function of a mobile device such as an LCD, a CPU, Wi-Fi, 3G, a GPS, an audio, or a memory. The module may further include an acceleration sensor, an illuminance sensor, a magnetic field sensor, a pressure sensor, a proximity sensor, and a temperature sensor which are sensors collecting a sense related signal such as light, sound, or temperature.

Here, the coding information may include a source code and an annotation code indicating explanation on the source code. The annotation code is a sort of metadata which is used in addition to the source code and usually is prefixed with a symbol "@".

In contrast, the analyzing apparatus of the present disclosure may receive operation information and coding information from a mobile device in which an application to be analyzed by the developer is installed in a wired or wireless manner and estimate the context through the received information.

Hereinafter, a process of estimating contexts will be described with reference to FIGS. 2A and 2B.

FIGS. 2A and 2B are views illustrated for explaining a method for estimating a context according to an environment in which an application is executed, according to an exemplary embodiment of the present disclosure.

The estimating unit 110 may estimate contexts by comparing the source code and the annotation code with the operation information.

Specifically, there are two corresponding modules corresponding to an application which is being currently executed. When it is assumed that operation information on two corresponding modules is "a" and "b", respectively, as illustrated in FIG. 2A, if a value of "a" is not value1, the estimating unit 110 executes a user code corresponding to a context A. In this case, "@Context_A_Start" is an annotation code indicating that a user code corresponding to a context A starts and "@Context_A_End" is an annotation code indicating that the user code corresponding to the context A ends. In this case, the user code means a source code which is created by a user as a sort of a source code.

In contrast, in FIG. 2B, when the value of "a" is not value1, a user code corresponding to a context B is executed. Further, when the value of "a" is value1, and a value of "b" is larger than value2, a user code corresponding to a context C is executed.

For example, it is assumed that a music listening application is executed, and an Audio module and a Wi-Fi module operate while the music listening application is executed. In this case, when a value of the Audio module is not value1, the user code is processed. Further, a case when the user code is processed is estimated as a "situation of listening to music while sleeping". In contrast, when the value of the Audio module is value1, but a value of the Wi-Fi module is larger than value2, the corresponding user code is processed. Further, a case when the user code is processed is estimated as a "situation of listening to music while using public transportation".

For reference, in the present exemplary embodiment, when two corresponding modules operate, the context is estimated. However, the present invention is not limited thereto and the context may be estimated even when three or more corresponding modules operate. Further, even when a plurality of applications is simultaneously executed, individual contexts may be estimated for every corresponding module corresponding to each application.

As described above, the estimating unit 110 may estimate the context by matching the source code and the annotation code of the application in which the operation information on the corresponding module is executed.

Referring to FIG. 1 again, the calculating unit 120 may calculate a power consumption against power limit for every corresponding module with respect to a real-time power consumption on the basis of a power consumption requirement, based on the real-time power consumption for every corresponding module and the power consumption requirement for every corresponding module. That is, the calculating unit 120 may calculate the power consumption against power limit for every corresponding module regarding whether the real-time power consumption exceeds a power threshold value for the power consumption requirement.

Here, the threshold value for the power consumption requirement is a reference value which is a criterion for generation of excessive power consumption of an electric energy which is consumable in accordance with the operation of the corresponding module and may be arbitrarily set by a developer. That is, as represented in the following Table 1, a power consumption requirement may be set by matching an object which is a subject of the requirement and a requirement for the object for every arbitrary generated ID, in advance.

For example, when an ID is Req 001, a case when a power of a GPS which is a lower object operating in correspondence with an entire device which is an upper object is lower than 200 mW may be set as a power consumption requirement. Further, for example, when an ID is Req 003, a case when a power of a GPS which is a lower object operating in correspondence with an application A which is an upper object is lower than 100 mW may be set as a power consumption requirement.

TABLE 1

| Requirement ID | Object | | Requirement | | |
|---|---|---|---|---|---|
| Req. 001 | Device | GPS | Power | Below | 200 mW |
| Req. 002 | Device | GPS | Delay | Below | 3 sec |
| Req. 003 | Application A | GPS | Power | Below | 100 mW |
| Req. 004 | Application A | All | Power | Below | 300 mW |

The calculating unit 120 may calculate a real-time power consumption for every corresponding module to calculate a power consumption against power limit. Specifically, the calculating unit 120 may calculate the real-time power consumption based on a power model indicating the power consumption for every corresponding module in accordance with execution of the application and state information indicating at least one operation state for every corresponding module. That is, the calculating unit 120 may individually calculate the power consumption when each operation is performed depending on which operation is performed by a module for every corresponding module, based on the power model.

For example, it is assumed that when a notepad application is executed, a memory module is operated. In this case, when in the current state, the notepad application is just executed at the first time, it is calculated that the memory module consumes a power of 10 mW as an initial state from the power model. Further, when a specific memo is stored in the current state, it is calculated that the memory module consumes a power of 50 mW from the power model.

Here, the power model is a model used to analyze the power consumption of the corresponding module in accordance with execution of the application and may identify a consumed power based on a signal extracted from a corresponding module for every application. For reference, the power model may be stored in advance in the analyzing apparatus to be used. When the power model is not stored, a power model of a mobile device in which an application to be analyzed is executed is directly input by the developer to be used.

In the meantime, the calculating unit 120 may calculate the real-time power consumption further based on state transition information indicating a change from an initial state for every corresponding module to a current state which selectively passes through at least one intermediate state. That is, the calculating unit 120 may individually calculate the power consumption to which real-time change of each operation is reflected, depending on which operation is performed by a module for every corresponding module, based on the power model. For reference, the state transition information may indicate change from the initial state to the current state without passing through the intermediate state or may indicate change from the initial state to the current state which passes through at least one intermediate state.

For example, it is assumed that when a dialer application is executed, a 3G module is operated. In this case, when in the current state, the application is just executed at the first time, it is calculated that the 3G module is in an initial state and consumes a power of 10 mW, from the power model. Further, when the current state is a call connected state and the call is connected via a standby state for call connection, the calculating unit 120 may calculate that the 3G module is in a current state via the intermediate state and consumes a power of 300 mW from the power model. Further, when the current state is a call connected state, but the call is directly connected without passing through a standby state for call connection, the calculating unit 120 may calculate that the 3G module is in a current state which does not pass through the intermediate state and consumes a power of 100 mW from the power model.

By doing this, it is confirmed that a power consumed when an operating state of the corresponding module is changed from the initial state to the current state and a power consumed when an operating state of the corresponding module is changed from the initial state to the current state via at least one intermediate state are different. For example, when the operating state of the corresponding module is changed from the initial state to the current state via at least one intermediate state, more power may be consumed than that of the case when the operating state is directly changed from the initial state to the current state. As described above, the developer may accurately analyze power which is consumed by the corresponding module in real time, by further reflecting the state transition information.

Therefore, according to the present disclosure, the power consumption may be calculated by instantly reflecting not only the operating state of the corresponding module corresponding to an application which is currently executed, but also state change indicating which state is taken before the current state and which state is taken to take the current state.

The calculating unit 120 may calculate a real-time power consumption for every corresponding module based on a state diagram including a change sequence among an initial state, an intermediate state, and the current state for every corresponding module generated using the above-described state information and state transition information.

The state diagram may further include a corresponding power level for at least one operating state among a plurality of power levels set with respect to the power consumption against power limit. That is, a corresponding power level may be assigned to each of at least one operating state of the corresponding module based on a power level which is set for every step indicating how much real-time power is consumed as compared with a threshold value for the power requirement through the state diagram.

Hereinafter, the state diagram will be described in more detail with reference to FIG. 3. For reference, FIG. 3 is a conceptual diagram illustrated for explaining a status diagram for every corresponding module, according to an exemplary embodiment of the present disclosure.

For example, referring to FIG. 3, it is assumed that a module corresponding to a specific application is a GPS module and the application is executed so that the GPS module has a total of three operating states of an initial state APP_START, a connection attempting state GPS_LOSE, and a connection completed state GPS_GET.

In this case, when the GPS module is in the initial state APP_START, it is calculated that a power of 10 mW is consumed, when the GPS module is in the connection attempting state GPS_LOSE, it is calculated that a power of 100 mW is consumed, and when the GPS module is in the connection completed state GPS_GET, it is calculated that a power of 400 mW is consumed.

Further, when it is assumed that when the power of higher than 5 mW and lower than 50 mW is consumed with respect to the power consumption against power limit, it is set as a power consumption stable level, when the power of higher than 50 mW and lower than 200 mW is consumed with respect to the power consumption against power limit, it is set as a power consumption attention level, and when the power of higher than 200 mW and lower than 500 mW is consumed with respect to the power consumption against power limit, it is set as a power consumption warning level, if the GPS module is in the initial state APP_START, the power consumption stable level is assigned to the power level, in the connection attempting state GPS_LOSE, the power consumption attention level is assigned to the power level, and in the connection completed state GPS_GET, the power consumption warning level is assigned to the power level.

In the meantime, when a plurality of corresponding modules is operated in accordance with the execution of the application, the calculating unit 120 may calculate a real-time power consumption for each of the plurality of corresponding modules based on the combined state diagram which is generated by combining state diagrams corresponding to the plurality of corresponding modules. The combined state diagram may include a change sequence between the initial state, the intermediate state, and the current state among the plurality of corresponding modules and also include a sequence in which a change sequence between the initial state, the intermediate state, and the current state of each of the plurality of corresponding modules and a change sequence between the initial state, the intermediate state, and the current state among the plurality of modules are mixed.

Hereinafter, the combined state diagram will be described in more detail with reference to FIG. 4. FIG. 4 is a conceptual diagram illustrated for explaining a combined status diagram according to a combination for each of a plurality of corresponding modules, according to an exemplary embodiment of the present disclosure.

For example, referring to FIG. 4, it is assumed that modules corresponding to a specific application are a GPS module and a Wi-Fi module and according to the combined state diagram generated by combining state diagrams corresponding to respective modules, when the application is executed, there are total of seven operating states including a state in which both the GPS module and the Wi-Fi module are in an initial state APP_START, a state in which both the GPS module and the Wi-Fi module are in a connection attempting state GPS_LOSE, a state in which the GPS module is connected but the Wi-Fi module is in the connection attempting state GPS_GET & WiFi-LOSE, a state in which both the GPS module and the Wi-Fi module are connected but the Wi-Fi module is in a connection completed state to be connected with a strong signal GPS_GET & WiFi_GET_LOUD, a state in which both the GPS module and the Wi-Fi module are connected but the Wi-Fi module is in a connection completed state to be connected with a weak signal GPS_GET & WiFi_GET_QUIET, a state in which the GPS module is in a connection attempting state but the Wi-Fi module is in a connection completed state to be connected with a strong signal GPS_LOSE & WiFi_GET_LOUD, and a state in which the GPS module is in a connection attempting state and the Wi-Fi module is in a connection completed state to be connected with a weak signal GPS_LOSE & WiFi_GET_QUIET.

In this case, it is possible to calculate the real-time power consumption to which not only the operating state according to the combination of the respective modules but also state change regarding which state is taken before the current state and which state has been through to take the current state is reflected through state information between the GPS module and the Wi-Fi module and state transition information included in the combined state diagram. Even though not illustrated in the drawings, the combined state diagram may further include power levels as in the state diagram.

As described above, the calculating unit 120 compares the calculated real-time power consumption with a predetermined threshold value to calculate a power consumption against power limit indicating how much the real-time power is consumed with respect to the threshold value. Here, the power consumption against power limit may include at least one of a ratio of a power consumption against power limit indicating a ratio of the real-time power consumption with respect to the threshold value and a graph of the ratio of the power consumption against power limit.

The storing unit 130 matches the calculated power consumption against power limit and the estimated context to be stored. That is, the storing unit 130 stores the power consumption against power limit calculated by reflecting the real-time power consumption by matching with the context which is estimated for every corresponding module. Therefore, it is possible to know how much power is consumed by the corresponding module in real time in a state in which the context which is a specific situation defined according to the operation of the corresponding module is estimated. Moreover, the matching result between the power consumption against power limit and the context stored in the storing unit 130 may be displayed through the analyzing apparatus or utilized for information to be transmitted to an external device.

FIG. 5 is a block diagram illustrated for explaining an apparatus for analyzing a cause of excessive power consumption of an application according to another exemplary embodiment of the present disclosure and FIG. 6 is a view illustrated for explaining a state in which in accordance with selection of a context and a corresponding module, a power consumption against power limit for the selected corresponding module and associated details are displayed, according to another exemplary embodiment of the present disclosure. Referring to FIG. 5, an apparatus for analyzing a cause of excessive power consumption of an application according to another exemplary embodiment of the present disclosure includes an estimating unit 510, a calculating unit 520, a storing unit 530, a display unit 540, and a determining unit 550.

Prior to describing the present exemplary embodiment, the estimating unit 510, the calculating unit 520, and the storing unit 530 have the same or similar structure and characteristics as the estimating unit 110, the calculating unit 120, and the storing unit 130 of FIG. 1. Therefore, in the present exemplary embodiment, the description thereof will be omitted and only the display unit 540 and the determining unit 550 will be described in detail.

The display unit 540 may display the power consumption against power limit for the selected corresponding module and related matters in accordance with the selection of the context and the corresponding module to enable intuitive analysis of the operation of the application which is being currently executed and the corresponding module.

Specifically, referring to FIG. 6, the display unit 540 may further display the power consumption against power limit regarding whether the real-time power consumption exceeds the threshold value for the power consumption requirement for every corresponding module. In other words, the display unit 540 may display the power consumption against power limit for at least one corresponding module in accordance with a combination of at least one corresponding module selected from the plurality of corresponding modules and one context selected from a plurality of contexts including the estimated context.

In this case, the display unit 540 may display the power consumption against power limit by at least one of a ratio of a power consumption against power limit indicating a ratio of the real-time power consumption with respect to the threshold value and a graph of the ratio of the power consumption against power limit. The graph may be represented by bars and the bars may have different lengths depending on how much the real time power consumption reaches the threshold value. In the present exemplary embodiment, even though the graph regarding the ratio of the power consumption against power limit is represented by bars, the present invention is not limited thereto and various types such as a donut type or a line type may be used.

As an example, in the combination in which a context A and a GPS module are selected, when a threshold value for the power consumption requirement of the application A is set to be 1000 mW or lower and a power consumption of the application A is 700 mW, the power consumption against power limit with respect to the threshold value is displayed to be 70%.

As another example, in the combination in which a context A and a GPS module are selected, when a threshold value for the power consumption requirement of the GPS module is set to be 450 mW or lower and a power consumption of the GPS module is 558 mW, the power consumption against power limit with respect to the threshold value is displayed to be 124%.

Further, as another example, even though not illustrated in the drawing, when a context B and a GPS module are selected, the threshold value for the power consumption requirement of the GPS module is set to be different from the case when the context A and the GPS module are selected and the real-time power consumption and the power consumption against power limit are also differently calculated and displayed.

For reference, as the power consumption of the GPS module exceeds the threshold value, a specific symbol may be displayed together to display that the power requirement is not achieved.

Further, the display unit 540 may further display a state diagram or a combined state diagram for every corresponding module. In other words, the display unit 540 may display a plurality of corresponding modules as a list and may further display the state diagram for at least one selected corresponding module in accordance with the selection of at least one corresponding module from the plurality of corresponding modules or the combined state diagram. Further, in the state diagram or the combined state diagram, the initial state, the intermediate state, and the current state among the state information for every corresponding module may be displayed to be distinguished from each other. For example, different thicknesses or colors of the display line may be used. Further, in the state diagram or the combined state diagram, different power levels corresponding to each of at least one state information for every corresponding module may be displayed. For example, different colors or symbols of the display line may be used.

Further, the display unit 540 may display the plurality of contexts as a list and further display a context diagram for each of the selected context in accordance with selection of one context of the plurality of contexts.

The determining unit 550 may determine an excessively consuming corresponding module which generates excessive power consumption among the corresponding modules in accordance with the real-time power consumption for every corresponding module. That is, the determining unit 550 may determine a corresponding module in which the power consumption exceeds the threshold value based on the power consumption against power limit for every corresponding module as the excessively consuming corresponding module.

For example, referring to FIG. 6, in a combination in which the context A and the GPS module are selected, when a threshold value for the power consumption requirement of the GPS module is set to be 450 mW or lower and the power consumption of the GPS module is 558 mW, the GPS module may be determined as the excessively consuming corresponding module.

In this case, when at least one corresponding module is determined as the excessively consuming corresponding module, the display unit 540 may further display coding identification information for identifying coding information corresponding to the estimated context. Here, the coding identification information may include a source code for a context which is compared with operation information of a corresponding module which is determined as the excessively consuming corresponding module, a position of annotation information, and a corresponding file name.

For example, in FIG. 6, it is described that a file in which fault is generated is GPsinfor.java and a location where fault is generated is 152 lines and this means that the location of the source code and the annotation code for the context A which is compared with the operation information of the GPS module start from a 152-nd line among the entire codes and the corresponding file name is GPsinfor. The developer may newly code the source code for the context A where the fault is generated so as not to cause the excessive power consumption so that the power of the corresponding module for the context A may be optimized.

That is, according to another exemplary embodiment of the present disclosure, a module which generates excessive power consumption is analyzed in consideration of an operating status for each of modules corresponding to an executing application and changes in the operating status, thereby providing a development environment in which the power consumption of the module is optimized. In the meantime, the display unit 540 may further display a graph representing changes in the real-time power consumption for every corresponding module.

FIG. 7 is a flowchart illustrated for explaining a method for analyzing a cause of excessive power consumption of an application according to an exemplary embodiment of the present disclosure.

Referring to FIGS. 1 and 7, in step S710, an estimating unit 110 of an apparatus for analyzing a cause of excessive power consumption of an application may estimate a context which is a specific situation defined according to an environment in which an application is executed, based on operation information on an operation of corresponding modules which correspond to an application which is being currently executed and coding information of the application.

Here, the coding information includes a source code and an annotation code indicating explanation on the source code and the estimating unit 110 compares the source code and the annotation code with the operation information to estimate the context.

Next, in step S720, a calculating unit 120 of the apparatus for analyzing a cause of excessive power consumption of an application may calculate a power consumption against power limit regarding whether the real-time power consumption exceeds a threshold value, based on the real-time power consumption for every corresponding module and the threshold value for the power consumption requirement for every corresponding module.

Further, the calculating unit 120 may calculate the real-time power consumption based on a power model indicating the power consumption for every corresponding module in accordance with execution of the application and state information indicating at least one operation state for every corresponding module.

Furthermore, the calculating unit 120 may calculate the real-time power consumption further based on state transition information indicating a change from an initial state for every corresponding module to a current state which selectively passes through at least one intermediate state.

The calculating unit 120 may calculate the real-time power consumption for every corresponding module based on a state diagram including a change sequence among an initial state, an intermediate state, and the current state for every corresponding module generated using the above-described state information and state transition information.

When a plurality of corresponding modules is operated in accordance with the execution of the application, the calculating unit 120 may calculate the real-time power consumption for each of the plurality of corresponding modules based on the combined state diagram which is generated by combining state diagrams corresponding to the plurality of corresponding modules.

Next, in step S730, the storing unit 130 of the apparatus for analyzing a cause of excessive power consumption of an application may match and store the calculated power consumption against power limit and the estimated context.

In this case, the methods of the estimating step S710, the calculating step S720, and the storing step S730 may be described based on the above description of the estimating unit 110, the calculating unit 120, and the storing unit 130 of FIG. 1.

FIG. 8 is a flowchart illustrated for explaining a method for analyzing a cause of excessive power consumption of an application according to another exemplary embodiment of the present disclosure.

Referring to FIGS. 5 and 8, in step S810, an estimating unit 510 of an apparatus for analyzing a cause of excessive power consumption of an application may estimate a context which is a specific situation defined according to an environment in which an application is executed, based on operation information on an operation of corresponding modules which correspond to an application which is being currently executed and coding information of the application.

Next, in step S820, a calculating unit 520 of the apparatus for analyzing a cause of excessive power consumption of an application may calculate the power consumption against power limit regarding whether the real-time power consumption exceeds a threshold value, based on the real-time power consumption for every corresponding module and the threshold value for the power consumption requirement for every corresponding module.

Next, in step S830, a storing unit 530 of the apparatus for analyzing a cause of excessive power consumption of an application may match and store the calculated power consumption against power limit and the estimated context.

Next, in step S840, a display unit 540 of the apparatus for analyzing a cause of excessive power consumption of an application may display the power consumption against power limit for at least one corresponding module in accordance with a combination of at least one corresponding module selected from the plurality of corresponding modules and one context selected from a plurality of contexts including the estimated context.

In this case, the methods of the estimating step S810, the calculating step S820, the storing step S830, and the displaying step S840 may be described based on the above description of the estimating unit 510, the calculating unit 520, the storing unit 530, and the display unit 540 of FIG. 5.

FIG. 9 is a flowchart illustrated for explaining a method for analyzing a cause of excessive power consumption of an application according to still another exemplary embodiment of the present disclosure.

Referring to FIGS. 5 and 9, in step S910, an estimating unit 510 of an apparatus for analyzing a cause of excessive power consumption of an application may estimate a context which is a specific situation defined according to an environment in which an application is executed, based on operation information on an operation of corresponding modules which correspond to an application which is being currently executed and coding information of the application.

Next, in step S920, a calculating unit 520 of the apparatus for analyzing a cause of excessive power consumption of an application may calculate the power consumption against power limit regarding whether the real-time power consumption exceeds a threshold value, based on the real-time power consumption for every corresponding module and the threshold value for the power consumption requirement for every corresponding module.

Next, in step S930, a storing unit 530 of the apparatus for analyzing a cause of excessive power consumption of an application may match and store the calculated power consumption against power limit and the estimated context.

Next, in step S940, a determining unit 550 of the apparatus for analyzing a cause of excessive power consumption of an application may determine a corresponding module which exceeds a threshold value based on the power consumption against power limit for every corresponding module as an excessively consuming corresponding module which generates excessive power consumption.

In this case, the methods of the estimating step S910, the calculating step S920, the storing step S930, and the determining step S940 may be described based on the above description of the estimating unit 510, the calculating unit 520, the storing unit 530, and the determining unit 550 of FIG. 5.

For now, although a specific exemplary embodiment of the present invention has been described above, it is obvious that various changes are allowed without departing the scope of the present invention. Accordingly, the scope of the present invention is not construed as being limited to the described embodiments but is defined by the appended claims as well as equivalents thereto.

As described above, although the present invention has been described by limited embodiments and drawings, the present invention is not limited to the embodiments, and it will be apparent to those skilled in the art to which the present invention pertains that various modifications and variations may be made from the description. Therefore, the spirit of the present invention needs to be interpreted only by the appended claims and all equivalent modifications are included within the spirit of the present invention.

What is claimed is:

1. An apparatus for analyzing a cause of excessive power consumption of an application, the apparatus comprising:
   a processor configured to:
      estimate a context which is a specific situation defined in accordance with an environment in which the application is executed, based on operation information on an operation of corresponding modules which correspond to the application which is being currently executed and coding information of the application;
      calculate a power consumption against power limit for every corresponding module regarding whether the real-time power consumption exceeds a threshold value, based on the real-time power consumption for every corresponding module and the threshold value for the power consumption requirement for every corresponding module;
      calculate the real-time power consumption based on a power model representing a power consumption for every corresponding module in accordance with execution of the application and state information representing at least one operation for every corresponding module; and
      calculate the real-time power consumption further based on state transition information representing changes from an initial state for every corresponding module to a current state which selectively passes through at least one intermediate state, and
   a memory configured to match and store the calculated power consumption against power limit and the estimated context.

2. The apparatus according to claim 1, wherein the coding information includes a source code and an annotation code indicating explanation on the source code and the processor is further configured to estimate the context by comparing the source code and the annotation code with the operation information.

3. The apparatus according to claim 2, wherein the context is selected from a plurality of contexts defined in accordance with an environment in which the application is executed.

4. The apparatus according to claim 1, wherein the processor is further configured to calculate the real-time power consumption for every corresponding module based on a state diagram including a changing sequence between the initial state, the intermediate state, and the current state for every corresponding module which is generated using the state information and the state transition information.

5. The apparatus according to claim 4, wherein the state diagram further includes a power level corresponding to at least one operation state among a plurality of power levels set based on the power consumption against power limit.

6. The apparatus according to claim 4, wherein when a plurality of corresponding modules operates in accordance with execution of the application, the processor is further configured to calculate the real-time power consumption for each of the plurality of corresponding modules based on a combined state diagram generated by combining state diagrams corresponding to the plurality of corresponding modules.

7. The apparatus according to claim 1, wherein the power consumption against power limit is displayed by at least one of a ratio of a power consumption against power limit representing a ratio of the real-time power consumption with respect to the threshold value and a graph regarding the ratio of the power consumption against power limit.

8. The apparatus according to claim 1, further comprising:
   a display configured to display a power consumption against power limit for at least one corresponding module in accordance with a combination of at least one corresponding module selected from the plurality of corresponding modules and one context selected from a plurality of contexts including the estimated context.

9. The apparatus according to claim 8, wherein the processor is further configured to:
   determine a corresponding module which exceeds the threshold value as an excessively consuming corresponding module which generates excessive power consumption, based on a power consumption against power limit for every corresponding module.

10. The apparatus according to claim 9, wherein when at least one corresponding module is determined as the excessively consuming corresponding module, the display is further configured to display coding identification information for identifying the coding information corresponding to the estimated context.

11. A method for analyzing a cause of excessive power consumption of an application by an apparatus for analyzing a cause of excessive power consumption of the application, the method comprising:
   estimating a context which is a specific situation defined in accordance with an environment in which the application is executed, based on operation information on an operation of corresponding modules which correspond to an application which is being currently executed and coding information of the application, by a processor;
   calculating a power consumption against power limit for every corresponding module regarding whether a real-time power consumption exceeds a threshold value, based on the real-time power consumption for every corresponding module and the threshold value regarding the power consumption requirement for every corresponding module, by the processor; and
   matching and storing the calculated power consumption against power limit and the estimated context, by a memory,
   wherein the calculating the power consumption includes calculating the real-time power consumption based on a power model representing a power consumption for every corresponding module in accordance with execution of the application and state information representing at least one operation for every corresponding module, and wherein the calculating the power consumption includes calculating the real-time power consumption further based on state transition information representing changes from an initial state for every corresponding module to a current state which selectively passes through at least one intermediate state.

12. The method according to claim 11, wherein the coding information includes a source code and an annotation code indicating explanation on the source code and the estimating includes estimating the context by comparing the source code and the annotation code with the operation information.

13. The method according to claim 11, wherein the calculating includes calculating the real-time power consumption for every corresponding module based on a state diagram including a changing sequence between the initial state, the intermediate state, and the current state for every corresponding module which is generated using the state information and the state transition information.

14. The method according to claim 13, wherein the calculating further includes calculating the real-time power consumption for each of the plurality of corresponding modules based on the combined state diagram which is generated by combining state diagrams corresponding to the plurality of corresponding modules when a plurality of corresponding modules is operated in accordance with the execution of the application.

15. The method according to claim 11, further comprising:

displaying a power consumption against power limit for at least one corresponding module in accordance with a combination of at least one corresponding module selected from the plurality of corresponding modules and one context selected from a plurality of contexts including the estimated context.

16. The method according to claim 11, further comprising:

determining a corresponding module which exceeds the threshold value as an excessively consuming corresponding module which generates excessive power consumption, based on a power consumption against power limit for every corresponding module.

* * * * *